(12) United States Patent
Wu

(10) Patent No.: US 7,302,319 B2
(45) Date of Patent: Nov. 27, 2007

(54) PERSONAL TRANSPORTATION SYSTEM

(76) Inventor: Hengning Wu, 11627 N. Shore Dr. 2B, Reston, VA (US) 20190

( * ) Notice: Subject to any disclaimer, the term of this patent is extended or adjusted under 35 U.S.C. 154(b) by 312 days.

(21) Appl. No.: 10/711,643

(22) Filed: Sep. 29, 2004

(65) Prior Publication Data
US 2005/0038575 A1 Feb. 17, 2005

Related U.S. Application Data

(63) Continuation-in-part of application No. 10/249,753, filed on May 5, 2003, now abandoned.

(51) Int. Cl.
*G06F 7/00* (2006.01)
*B61B 1/00* (2006.01)
(52) U.S. Cl. ............... 701/19; 701/20; 104/27
(58) Field of Classification Search .......... 701/19–20, 701/23–25, 200–202, 205; 246/2 R, 14, 246/122 R, 209; 104/27–31, 18, 20, 130.07
See application file for complete search history.

(56) References Cited

U.S. PATENT DOCUMENTS 3,552,321 A * 1/1971 Priebe .................... 104/18
5,108,052 A * 4/1992 Malewicki et al. ........... 246/5

* cited by examiner

*Primary Examiner*—Yonel Beaulieu
(74) *Attorney, Agent, or Firm*—Hengning Wu

(57) ABSTRACT

An autonomous personal transportation system for moving passengers and light freights is constructed with a track network and small vehicles on the track network. There are a number of stations and stops for loading and unloading on side tracks off the mainline of the track network. The vehicle width is limited to a dimension for one seat. The vehicles can be coupled statically or dynamically to form a train. The track has side rails for the rigid wheels of the vehicle and a central rail for centering the vehicle on the guideway and providing additional acceleration and braking capability. The control system for the movement of vehicles is divided into three levels: the central control system, the wayside control system and the vehicle control system.

9 Claims, 5 Drawing Sheets

PERSONAL TRANSPORTATION SYSTEM

CROSS REFERENCE TO RELATED APPLICATIONS

This application is a continuation-in-part of patent application Ser. No. 10/249,753, filed May 5, 2003, now abandoned which is hereby incorporated by reference.

BACKGROUND OF INVENTION

The present invention relates to a personal transportation system. In particular, it relates to an autonomous transportation system for people and light freight.

Transportation plays an important role in civilization. Nowadays, many cities around the world are facing serious transportation problems, in particular, traffic gridlock and air pollution from automobile use. There are many studies on the traffic problems and potential solutions, for example, Stuck In Traffic: Coping With Peak-hour Traffic Congestion by Anthony Downs, The Brookings Institution, 1992, and Breaking Gridlock by Jim Motavalli, Sierra club books, 2001. A salient feature of today's city traffic is that travel origins and destinations have become increasingly dispersed, varied and distant. Accordingly, automobile becomes the dominant form of transportation due to its convenience. In the United States, automobile accounts for 90% of passenger transportation and 90% of people drive alone. The heavy dependence on automobile also leads to traffic gridlock, air pollution, traffic accidents, and the dependence on fossil energy. Although there are progress in fuel efficiency, efforts to increase the highway capacity seem to be difficult. In areas experiencing traffic congestion, it is very expensive to construct new highways and purchase the rights-of-way. The National Automated Highway System or Intelligent transportation systems in the United States attempts to increase highway capacity by embedding sensors on the roadway and automated control of vehicles in short following distances on dedicated lanes. However, considerable infrastructure cost and liability issues pose serious doubts on this approach (Transportation Research Board Special Report 253, National Academy of Sciences, 1998). In addition, automobile is not readily accessible to school children and the elderly, a large fraction of the population. On the other hand, existing public mass transportation systems such as subway, monorail, light rail and bus systems are less favored than automobile in terms of convenience and comfort. As urban and suburban traffic becomes more dispersed, it is difficult to maintain the high volume necessary to justify the high construction and operation cost. The frequent stops of the vehicles and the transfers needed for many destinations make trips lengthy and uncomfortable, even for cities with well-developed public transportation systems.

The limitations of existing transportation systems and the need for new ideas have long been recognized. In 1968, US Department of Housing and Urban Development published a report Tomorrow's Transportation: New Systems for the Urban Future. One concept to provide accessibility and service to the profusion of origins and destinations in metropolitan areas is "personal rapid transit", automated small personal vehicles on a network of exclusive guideways. It is originally proposed as a public transit system for areas of medium to low population density. The origin of the concept can even trace back to inventors as early as 1953 (See J. E. Anderson, Some Lessons From the History of Personal Rapid Transit, 1996). A demonstration project at Morgantown, West Virginia was funded, completed, and has been in continuous operation since 1975. Except for the vehicle size larger than current definition, the project demonstrated the basic features of a personal rapid transit system: 1) Fully automated vehicles capable of operation without human drivers. 2) Exclusive guideway. 3) Small vehicles. 4) Small guideways that can be located above ground, at ground level or underground. 5) Vehicles able to use all guideways and stations on a fully coupled network. 6) Direct origin to destination service, without a necessity to transfer or stop at intervening stations. 7) Service available on demand rather than on fixed schedules. Activities in other countries include Cabtrack in the United Kingdom, CVS in Japan, Cabinentaxi in Germany, Aramis in France. There are some recent systems, such as Taxi 2000 and its modification PRT 2000, and SkyTran in the United States, ULTRA in the United Kingdom, and RUF in Denmark.

The personal rapid transit concept offers some desirable features, but these systems have not been accepted for widespread implementation. Critical questions have been raised about the economical feasibility of the concept. See, for example, V. R. Vuchic, Personal Rapid Transit: An Unrealistic System, Urban Transport International (Paris), No 7, 1996, page 35. It seems to be mutually incompatible between the small size vehicles for low density travel and the substantial infrastructure investment for guideways, stations and sophisticated automation justifiable only for heavy traffic volumes. This is a reasonable argument in consideration of the costs of existing guideway systems such as subway, rail and monorail, and some previous personal rapid transit systems suffered from the dilemma. Attempts to increase the capacity by short headways of less than one second may face safety concerns similar to those of the automated highway system.

The criteria for the practical feasibility of a new transportation system may include: 1) Convenience and comfort. 2) Appropriate capacity. 3) Cost-effective. 4) Fuel efficiency, additional emphasis due to energy shortage. 5) Environment-friendly, air pollution, noise, aesthetic structure. 6) Safety, accident, theft, disease, weather. The traffic problems in urban and suburban areas cannot be adequately addressed by addition and improvement of existing transportation systems alone. New transportation systems are needed, and the new systems must demonstrate their feasibility against the above criteria.

SUMMARY OF INVENTION

Therefore, it is an object of the present invention to provide an automated personal transportation system for moving passengers and light cargo. This new mode of surface transportation, termed "autoway", is complemental to existing surface transportation modes of highway and railway. It can provide the advantages of personal transportation to a large number of people whose access to personal transportation (automobile) is previously limited. For example, school children are too young to drive a car, some senior citizens may be no longer able to drive a car but are otherwise socially active, and still other people are uncomfortable with the anxiety of driving. For autoway, the only thing a driver needs to know is the destination. Both private and public transportation can be operated on autoway. As for light cargo transportation, autoway can be an ideal delivery system in connection with electronic commerce for small items with dispersed destinations.

It is another object of the present invention to provide a high speed and high volume transportation with a competitive infrastructure cost. Autoway can provide a cost-effective solution to traffic congestions in many cities where it is very expensive to build additional highway or subway. When a portion of the traffic is moved to autoway, automobile users also get benefits of more pleasant driving experience without traffic congestions.

Still another object of the present invention is to provide a safe and environment-friendly transportation mode. A majority of automobile accidents are caused by human errors. This is essentially eliminated in the personal transportation system of autoway. The energy consumption of vehicles on autoway will also be significantly reduced. This will significantly reduce the air pollution in cities.

According to one aspect of the invention, a mall size vehicle, termed "autocar", is used on a railway-like track network. The vehicle width is limited to a dimension for one seat. The present invention maintains the advantages of both steel rail and personal transportation like automobile. Steel rail is an efficient, safe, and high speed transportation system. Modern railroad vehicles can be easily switched in a short time of 0.6 s, and a speed of about 300 km/hr can be achieved for high speed trains such as Shinkansen in Japan and TGV in France. The significant decreases in the vehicle size and weight open possibilities unavailable to ordinary railroads. This leads to small, light guideways and supporting structures. The guideways can be pre-manufactured with a high precision and at a low cost. This will significantly reduce the cost related to guideways and stations and the noise level during operation.

According to another aspect of the invention, a central rail is provided for centering the vehicle on the track. The guiding wheels on the vehicle are engaged with the central rail to reduce noises associated with the lateral vibration of the vehicle. In combination with the small weight of the vehicle and the high precision of the rail, a very low noise level will be obtained. Furthermore, at points of diverging and merging tracks, the central rail may act as a switching mechanism. In a preferred embodiment, the central rail is provided with a horizontal high-traction surface and vertical surfaces for guiding wheels. While the rigid wheels on side rails offer the advantages of low rolling drag and high speed reliability of conventional rail, a wheel on the high-traction central rail can be activated to provide acceleration and deceleration over 1 m/s$^2$ when necessary.

According to another aspect of the invention, the vehicles can be statically and dynamically coupled to form a train. Although most people drive alone on highway, a significant number of automobiles actually share the same direction at least for some segments of the trip. Since the destinations of vehicles are known to the system of autoway at the beginning, some vehicles can be properly coupled to form a train. Therefore, a high traffic capacity can be achieved at a conservative headway.

According to another aspect of the invention, the control system of autoway is divided into three levels: central control system, wayside control-point control system, and vehicle control system. The central control system is responsible for functions related to the whole autoway system, such as vehicle registration, user registration, and traffic control. The wayside control system is related to the operations of stations and stops, diverging, and merging. The vehicle control system is related to the operations at the vehicle level, such as speed, braking, coupling and decoupling procedures, and collision avoidance. The communication requirements will be less demanding than a completely centralized system. The automation infrastructure will cost less than the fixed block and moving block control methods normally used in railway. The system will be more error-tolerant. Since part of the control system cost scales up with the capacity, the system can be also economically viable for a relatively low traffic density.

DETAILED DESCRIPTION

Figure 1:
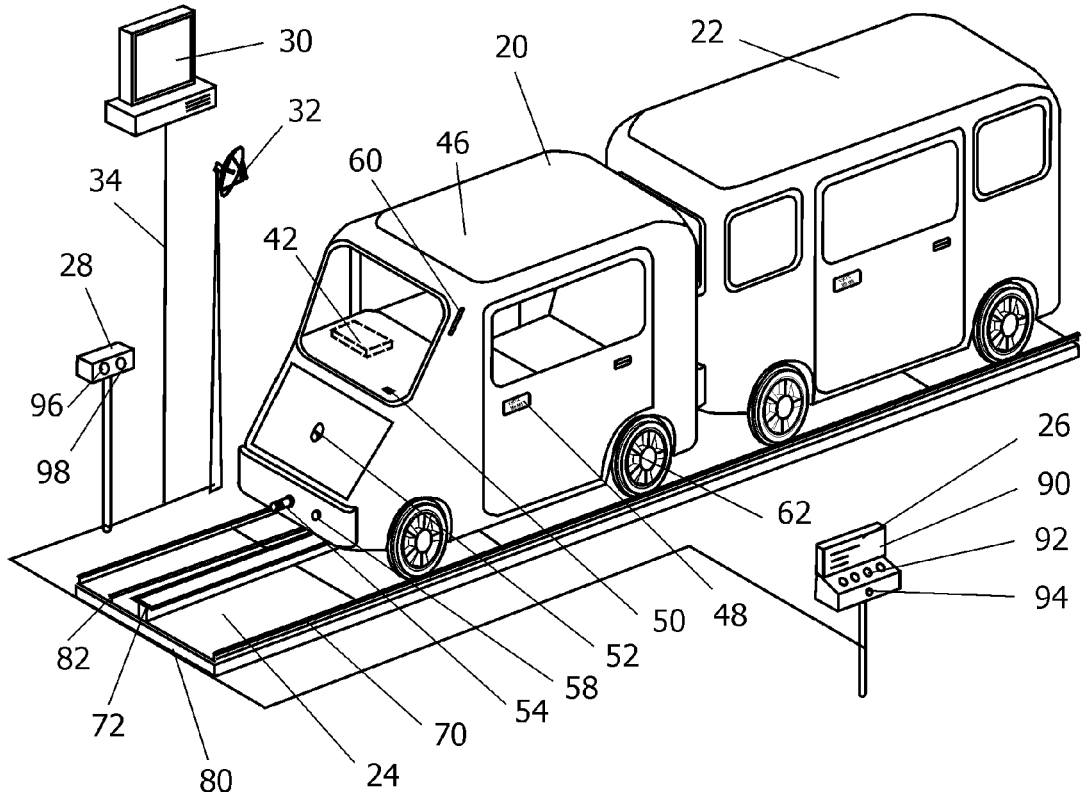
FIG. 1 shows the components of the personal transportation system.

FIG. 1 shows an autocar 20 and a cargo vehicle 22 on a section of the track network 24 of autoway. The track 24 has two side rails 70 for rigid wheels 62 of the autocar 20 and a central rail 72 for additional acceleration and deceleration. The track 24 is preferably pre-manufactured in factory with high precisions and supported on an open frame structure 80. The track network connects a number of stops and stations (not shown) for people to get on and get off an autocar. The difference between a stop and a station is that a station normally has empty autocars available immediately for service but a autocar will be dispatched to a stop upon request. In practice, many other services and amenities will also be available at stations, such as maintenance, restaurants, shops, and restrooms. The access notification device 26 installed at stops and stations informs the autoway system the demand for service. The wayside control-point control system 28 is used for the operation of switching actions at diverging, merging, and stops and stations. The access notification device 26 and the wayside control system 28 are connected to the central control system 30 by a communication network 36, preferably a wired communication network 34 such as copper wire or optical fiber. The communication to the autocars is provided by wireless communication means 32, and preferably a cellular structure is used to cover the track network.

The autocar 20 has its vehicle identification that can be read by a scanning device. In a preferred embodiment, an identification plate with printed vehicle identification number and corresponding bar code 48 is provided at the door. The printed identification number is for the human eyes and the bar code 48 is for the optical scanning device 96 at the wayside control system 28. For redundancy as a safety consideration, a smart card 50 with the identification information can also be installed in the vehicle and the identification information can be read by a smart card reader 98 at the wayside control system 28. The autocar has a distance sensor device 52 for the measurement of the distance and speed of an object in front of the vehicle. This can be a laser device, a radar device, or an ultrasonic device. The distance and speed data are fed to the vehicle control system 42, or a computer in the vehicle, for collision avoidance and dynamically coupling of vehicles to form a train. The couplers (front coupler 54 at vehicle front and rear coupler 56 at vehicle back) are used to connect two vehicles mechanically and electrically. An additional communication device 58 is provided for inter-vehicle communication. This is a point-to-point short distance communication device, such as an infrared transceiver or a high frequency radio device like blue-tooth device. The vehicle 20 communicates with the wayside control system 28 and the central control system 30 through a wireless means by the antenna 60.

An important feature of the autoway is the small size of the autocar 20. The width of the autocar body 46 should be as small as possible so that weight is distributed longitudinally to reduce the size of the guideway. The smallest width is for one seat. As the dimension for a comfortably seated person is 66 cm bin width y 82 cm, in length the width of the autocar can be chosen as about 85 cm. A typical vehicle size for one seat can be 85 cm in width, 140 cm in height, and 200 cm in length. The track gauge, or the distance between the central lines of the side rails, can be about 80 cm. For conventional railroad, the vehicle width is much greater than the rail gauge. Because the small size and light weight of the autocar, the relative magnitude of the side force due to wind can be significant. To increase the stability of the autocar, the track gauge is increased to a maximum value appropriate for the vehicle width. Since the average occupancy of automobile is 1.1 person in the United States, the choice of one seat per vehicle is reasonable. The personal nature of autocar provides people with comfort and privacy. Audio, video, and climate control can also be adjusted at individual's choice. For people traveling in a group, the autocars can be statically coupled to move together. A cargo vehicle 22 is also provided for more travel options. A cargo vehicle 22 is similar to an autocar 20 but is designed specifically for the transportation of small freights. A cargo vehicle with a typical size of autocar will provide a cargo space of about 0.8 m in width, 1 m in height and 1.5 m in length, or a cargo space of 1.2 $m^3$.

Other components of autocar are not shown but are obvious to those skilled in the art for the proper operation of the vehicle. The autocar must have a power source like an engine, or fuel cell, or battery, or electricity provided by a collection shoe from a power line. The autocar must have the necessary driving and braking means. In a preferred embodiment, the autocar 20 has a small battery but get its power mainly from the power line 82 by an electricity collection shoe. The power line can be direct current or two-phase or three-phase alternating current. The battery will provide power to drive the autocar to a nearby station when there is a power outrage, and to provide power to go through areas without power line such as stops, stations and parking facilities where power line may be terminated due to safety considerations. The battery can be rated for the driving distance, and a capacity of 4 km will be sufficient for most urban areas. The autocar also has a driving and braking system. In a preferred embodiment, electric motors are used to drive the wheels and regenerating brakes are preferred for normal operations.

Figure 2:
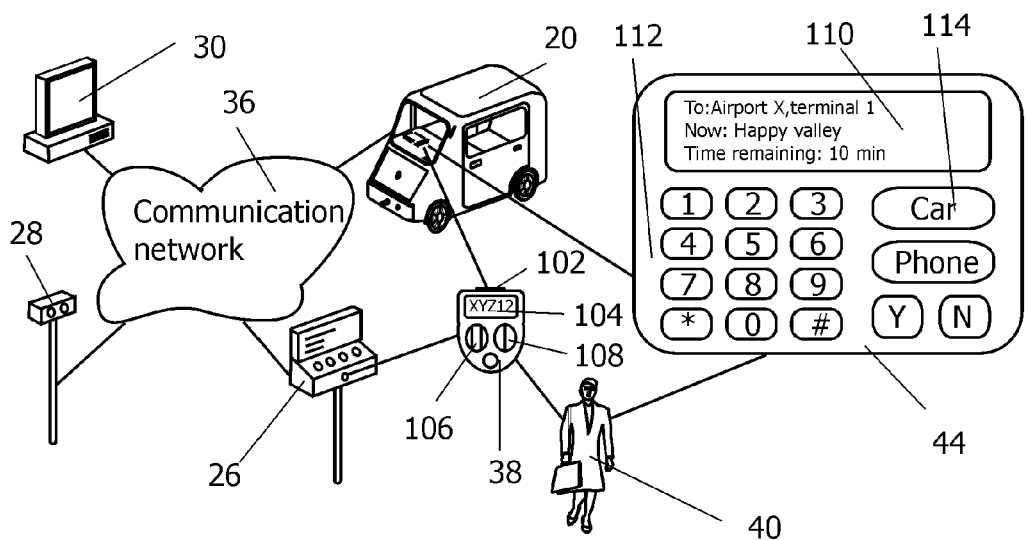
FIG. 2 shows the communication relationship in the personal transportation system.

The communication relationship of the components of the personal transportation system is illustrated in FIG. 2. The central control system 30, the wayside control system 28, the access notification device 26, and the autocar 20 are connected by a communication network 36. Each autocar 20 is registered with the central control system 30 for a unique vehicle identification number. For example, a combination of 5 digits and capital letters can be used for vehicle identification number. With the exclusion of easily confused letters of I and O, this combination can handle more than 24 million vehicles. Each stop or station is also assigned an identification number. The station (stop) identification can use a five-digit plus two-digit system. The five digits can have a maximum number of stations and stops of 100,000. The two optional digits can identify more detailed station locations within a general destination. For example, station identification number 12345 is given to airport x, with default station as 12345-00 and 12345-00 can be for general entrance, 12345-01 for terminal 1,12345-02 for terminal 2, and so on. A list of station and stop identifications can be provided in a booklet, or a map, or the computer in the vehicle. Voice input of station identification can also be provided. Although existing station ticket systems can be adapted for use in the present invention, a preferred method is issuance of an access device 38 for each user account. The access device 38 has an "open" button 106, a "close button" 107, a LCD display 104 for vehicle identification number, and a wireless communication means 102 such as infrared or radio transceiver for communication with the corresponding transceivers of the access notification system and the autocar. The access device 38 has a memory for storage of the user account number.

The vehicles on autoway can be private-owned or public-owned. For public-owned vehicles, the user 40 can have exclusive use like a rental car or shared use like a bus. When an user 40 push the "open" button 106 of the access device 38 in front of the access notification system 26 with its wireless transceiver 94, the access device 38 provides a signal of the user account number. The default option for an account with a private car is to use his private car. Generally, the user 40 can choose an exclusive use or shared use from the access notification system 26 for a public vehicle. The user can also make other choices such as a cargo vehicle and statically coupled vehicles in a group, using the function buttons 92 and the display 90 of the access notification system 26. For people in a group of statically coupled vehicles, each user in the group will then check in with the access notification system. The central control system 30 will assign a vehicle to serve the station. Then the vehicle identification number will be sent to the access device 38 and shown on the LCD display 104. The user 40 then proceed to find the autocar 20 with the identification number shown on the LCD display 104, and open the door of the autocar with the access device 38. The autocar 20 further verifies the user account information and the door is opened. The user 40 can then input the destination identification number from a communication panel 44 in the autocar 20. The communication panel 44 has a LCD display 110, keypads 112 for input, and function keys 114. When the user pushes the "car" key, he is able to input the destination identification number. When he pushes the "phone" key, he is able to make a phone call. The LCD display 110 on the panel 44 will show information such as the destination, the current location and the time remaining for the trip. The system will get the user to the destination without any stops or transfers at other stations. At the destination, the user 40 can use the "close" button 108 to lock the vehicle or the system will automatically lock the vehicle after a predetermined time or before moving. A user 40 can also change his destination using the communication panel 44 during the trip.

Figure 3:
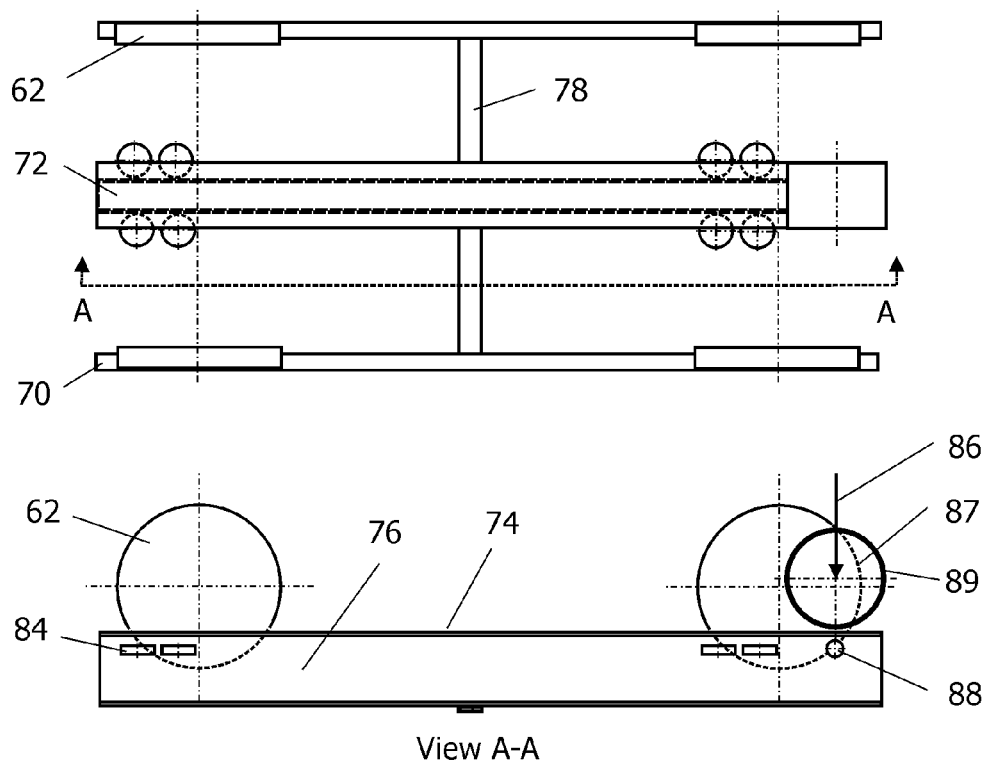
FIG. 3 illustrates the relationship of the vehicle and the track.

The operation of the vehicle 20 on the track 24 is further illustrated in FIG. 3. The side rails 70 and the central rail 72 are connected by cross bars 78 to form a track 24. The rigid wheels 62 run on the side rails 70 with a low friction surface, like a conventional railway system. Preferably the wheels 62 and the side rails 70 are made of steel. The side rails 70 offer the advantages of a low rolling drag and a reliable high speed operation. Therefore, it is possible to have a speed about 50 km/hr in local areas, a speed of about 100 km/hr on major routes, and an even higher speed for certain long distance routes. Pneumatic rubber tires are not used because of their unpredictable failure mode. However, it is known that steel wheel on rail has a very low wheel adhesion and it is difficult to maintain consistent acceleration and deceleration over about 1 m/s$^2$. Therefore, an additional central rail 72 is provided with a substantially horizontal surface 74 of high traction and substantially vertical surfaces 76 of low friction for guiding wheels. The vertical surfaces 76 are symmetric to the central vertical plane of the track 24, and the guiding wheels 84 will center the vehicle 20 on the track 24. Slight curvature may be introduced for the surfaces of the central rail, or other shapes may be used for the same functions. For example, the horizontal surface 74 may have a small convex curvature to avoid accumulation of water. The high friction surface can be accomplished by a rough surface with patterns, or a polymer layer on the metal similar to a deck surface for an aircraft carrier. The low friction surface can be obtained by polishing, lubrication, and special coatings like Teflon. A rubber tire 87 with a high traction surface 89 can be pushed by a mechanical or hydraulic means 86 onto the horizontal surface 74. This additional tire can be actuated by the vehicle control system to provide acceleration and deceleration over 1 m/s$^2$ when necessary or when slippery is detected from the loss of power on the rigid wheels 62. The force on the tire can be adjusted and can even be increased beyond the weight supported by the back wheels since a rail gripping condition can be created by the tire 87 and the lower wheels 88. This is useful for emergency braking, and the traction force is not limited by the weight of the vehicle. The vertical guiding wheels 84 mounted on the chassis of the vehicle reduce the noise related to the lateral vibration of the vehicle 20. At places where the central rail 72 starts or ends, the two vertical surfaces 76 gradually converge to facilitate the engagement of the guiding wheels 84. The central rail 72 is terminated at parking facilities for easy automatic parking operation. The central rail 72 also adds structural integrity to the track and prevents derailing of the vehicles. It should be noted that linear induction motors are often recommended for use in personal rapid transit systems in the literature. The advantage of the linear induction motors is more accurate control of vehicles for short headways. However, linear induction motors have the disadvantages of more expensive guideways and vehicles and a lower energy efficiency than electric motors. Therefore, linear induction motors are justifiable only for a very heavy traffic volume. When linear induction motors are used, they acts as the driving and braking means along the central rail.

Figures 4A, 4B:
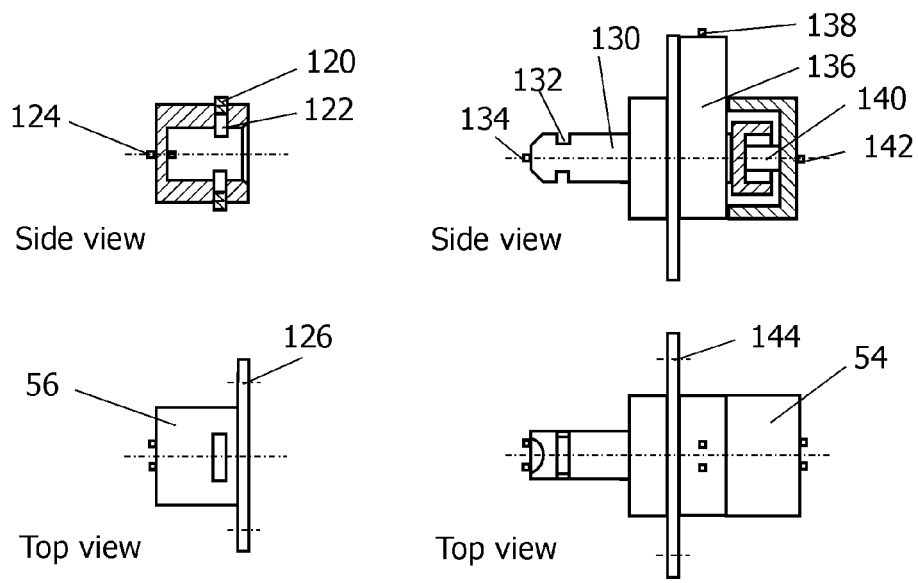
FIGS. 4A and 4B show the structure of the coupling components.

The coupling components of autocar consists of a rear coupler 56 (FIG. 4A) and a front coupler 54 (FIG. 4B). They are installed on the vehicle body 46 through holes 126 and 144 provided in the components. At least one of the couplers should be installed on a suspension with some freedom for movement to accommodate the misalignment of the vehicles during motion. The rear coupler 56 has a pair of keys 122 that are pushed toward the center line by springs 120 attached to them respectively. Once the instruction of coupling is given by the central control system 30, the vehicle control system 42 can get the distance and speed between the two vehicles from the distance sensor device 52, and then the following vehicle can be controlled to approach the leading vehicle slowly. The cylinder 130 of the front coupler 54 can push through the keys 122 until the keys 122 get into the opening 132 in the cylinder 130. The electrical contacts 134 in the cylinder 130 get in touch with corresponding contacts 124 in the rear coupler 56, and electrical connection is established between the two vehicles. To uncouple the vehicles, a motorized device 136 with proper electrical connections 138 can follow the instruction from the vehicle control system 42 and turn the cylinder 130 by 90 degrees. This can be done either electronically by control of the motor rotation, for example, by a servo motor, or mechanically by a gear structure with teeth on a quarter of the cylinder circumference. A force sensor 140, for example, a strain sensor, is used to measure the force between the two vehicles. Although the vehicles are set to the same speed when coupled, difference in speed controls will lead to a force of tension or compression. The signal from the force sensor 140 is provided to the vehicle control system 42 by a proper electrical connection 142, and the signal is used to adjust the speed so that the force is below a certain noise level.

The vehicles can be statically coupled or dynamically coupled. Static coupling is initiated by the user for people traveling in a group or for adding cargo and passenger space. Static coupling is accomplished before the vehicles leaving a station. Voice communication can be easily provided to vehicles in a statically coupled group. Dynamical coupling and decoupling are initiated by the central control system to improve the capacity of autoway. Vehicles that share some segments in their traveling routes are coupled together to form a train. The inter-vehicle communication in a train enables the vehicles to brake simultaneously during emergency. Coupled vehicles are much safer since malfunctioned vehicles can be pulled by the train.

Figure 5A:
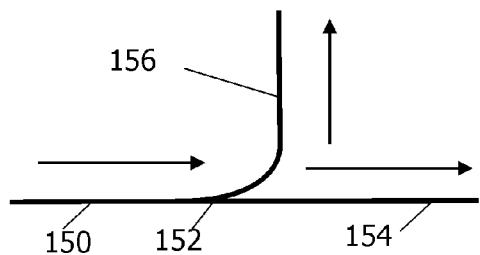
FIGS. 5A and 5B show diverging and merging tracks respectively and FIG. 5C shows a switching mechanism of the central rail.
Figure 5B:
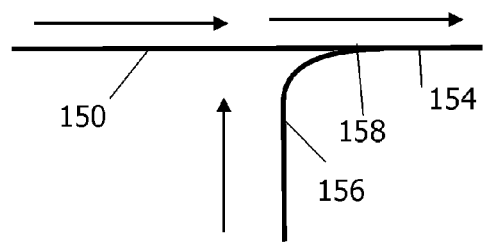

There are two types of switches in the track network: diverging 152 (FIG. 5A) and merging 158 (FIG. 5B). For diverging 152, the mainline 150 is divided into a tangent side 154 and a turnout side 156. For merging 158, a turnout side track 156 is merged with the mainline 150. The arrows indicate the directions of traffic flow. When the wayside control system 28 detects the identification of the approaching vehicle 20, the appropriate switch position at 152 and 158 will be set and verified according to the traffic flow instruction from the central control system 30. The speed instruction is also given to the vehicle 20 for this segment of the track. The central control system 30 will plan the traffic flow so that collision will not happen, and the wayside control system 28 will detect the vehicle movement and operate the switch accordingly to avoid two vehicles running into a merging track at the same time. In case of a violation, a stop instruction will be given to the vehicle immediately. Further, the distance sensor 52 of the vehicle 20 offers the safety of collision avoidance at the vehicle level. Since there are only a limited number of switch points, railroad switch can be a reasonable choice. Railroad switch is a reliable technology with a short switch time of 0.6 s for modern switches. A shortcoming of the railroad switch is that the central rail is terminated at the switching position. For even shorter headways, wayside actuated vehicle switch can also be considered.

Figure 5C:
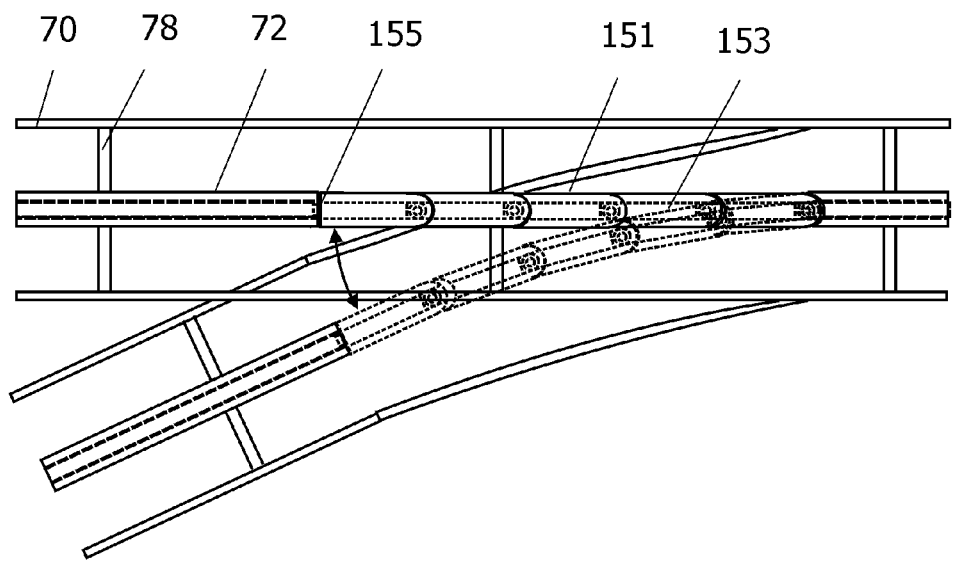

As a further improvement, a new switching mechanism with the central rail is shown in FIG. 5C. At a switching point, the central rail 72 has a movable section 151 like a mechanical arm with a number of segments 153 connected together at their joints. The structure is very similar to a mechanical arm of a robot. The segments can be rotated by servo motors installed at the joints for the specified angles to switch the movable section between two tracks. At the end of the movable section 151, there is a lock device 155 to secure the movable section to the fixed central rail 72. The lock device can be an electrically actuated pin and the corresponding socket at the fixed central rail. A switching operation consists of the following steps: 1) unlocking, the movable section is unlocked at its existing position and at the same time the appropriate signal is turned on to stop traffic on the existing track branch; 2) switching, the movable section is moved into a new position for the other track branch; and 3) locking, the movable section is locked into the other track branch, and the position is verified and the appropriate traffic signal is turned on. The switching can be done very fast in a tiny fraction of a second due to the fast and simultaneous action of the servo motors. The guiding wheels following the central rail will guide the motion of the vehicle. The steering mechanism of the automobile may be adapted. As both the central rail and the side rails are continuous, a more reliable operation is expected. The movable section is preferably made of high-strength lightweight materials like aluminum alloys, titanium alloys, and composite materials. The movable section can also be switched by a separate mechanical manipulator located at the side of the track. In comparison, a monorail has a much longer switching time of about 15 seconds since the monorail needs a large structural size in order to support the weight of the vehicles.

Figure 6A:
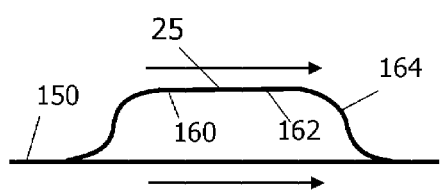
FIGS. 6A-6D show arrangements of stops and stations of autoway.
Figure 6B:
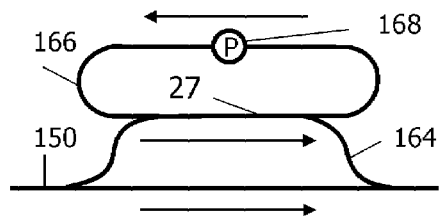
Figure 6C:
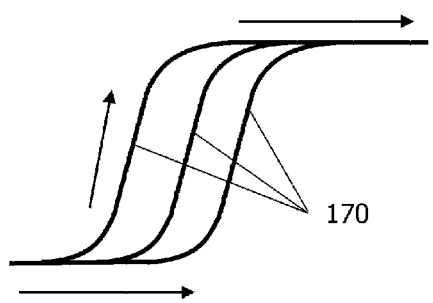
Figure 6D:
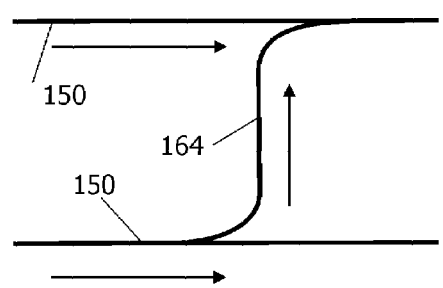

The stops and stations can have many variations. The simplest form of station 25 is just a side track 164 off the mainline 150 (FIG. 6A). The station 25 on the side track 164 is divided into an unloading area 160 and a loading area 162, each having a length for a number of vehicles appropriate for the traffic condition. At a station 25, there are empty vehicles on the track. At a stop 27, empty vehicles will move to a station or a parking facility immediately. Normally, a vehicle is immediately available at a station, and a user may wait for a short time, say less than 1 minute, for his vehicle at a stop. An approximate guideline is to have a stop for every major building and a station every 1000 m in urban areas. The arrangement of stops and stations on autoway is similar to the parking facilities of a personal transportation system like automobiles but quite different from mass transit systems. For a personal transportation system, the stations are close to business or residential buildings, and there are no stations on a major traffic route. For a mass transit system, the stations are located along the traffic route. In FIG. 6B, a stop 27 with a parking track 166 and a parking facility 168 is shown. This is a likely arrangement for a stop 27 in front of an office building. When there are many vehicles involved in a station such as a connection point to a mass transit system like an airport and a railway station, the well-known ladder tracks 170 can be used (FIG. 6C). In FIG. 6D, a track 164 on the side street between two mainlines 150 is used as a station.

Figure 7A:
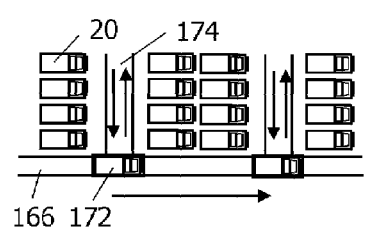
FIGS. 7A and 7B show parking facilities with random access and sequential access respectively.
Figure 7B:
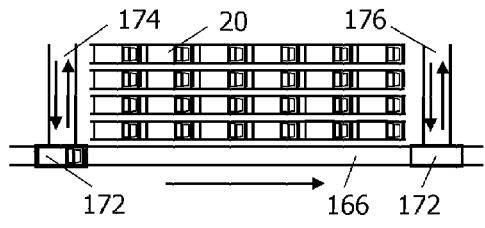

The major difference in the parking facility of autoway to conventional parking facility for automobiles is that all the parking on the autoway is varlet parking. The autoway system will automatically move the autocar to a nearest parking facility, saving people the trouble to find a parking lot and then walk back from the parking lot. The system keeps track of the locations of all vehicles and transfers a particular vehicle to the location of demand. This can be very convenient when the available parking lot is far away or when people get into a large shopping mall from one entrance and get out from another entrance. According to the types of access mode, the parking facility can be of two types: the random access type (FIG. 7A) and the sequential access type (FIG. 7B). The random access parking is for private vehicles and exclusive rental vehicles, and each vehicle can be accessed independently. A carrier 172 residing on the parking track 166 can move along a carrier track 174 perpendicular to the autocar track 166 to put the autocar 20 into a parking position. The sequential access parking is for public shared vehicles. A carrier 172 at the entrance 174 moves the vehicle 20 to a specific parking track to park sequentially. At the exit 176, a carrier 172 can move vehicles 20 out sequentially. This creates a first-in first-out sequential access. If the entrance is also used as exit, a first-in last-out sequence is created. Multilevel parking is possible and even more efficient when the carrier can move vertically at the entrance and exit point. In this case, multiple carriers can be used to move in a vertically circular form to improve parking speed. Depending on the parking arrangement, a parking lot can handle 6-12 times more autocars than automobiles. As a further variation, the parking carrier can move both horizontally and vertically to move vehicles into individual homes or offices in a building.

Figure 8:
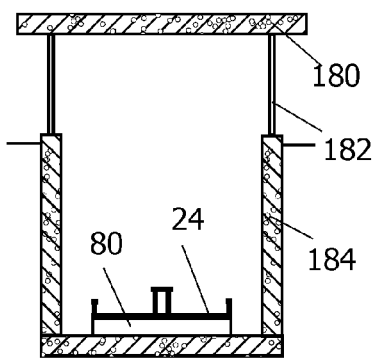
FIG. 8 shows a semi-underground construction of the track.

The autoway track can be built above the ground, at the ground level or underground. Preferably it can be built above the ground or underground to save the expenses for right-of-ways. One lane is normally used for street traffic, and two or four lances are used for major traffic routes. FIG. 8 shows a semi-underground construction appropriate for residential areas. The track 24 and its supporting structure 80 are located inside a shallow concrete passage 184 below the ground level and a concrete cover 180 with a width of a sidewalk road is supported by metal bars 182. The tunnel is open at the window level of the autocar 20 for people to see the natural light. This structure costs less than a complete underground construction, and can easily go underground for road crossing. The stations are easily accessible. It does not obstruct the views of automobile drivers on the road and residents in the houses. Grass can be planted on the top concrete to further improve the environment appeals.

Figure 9:
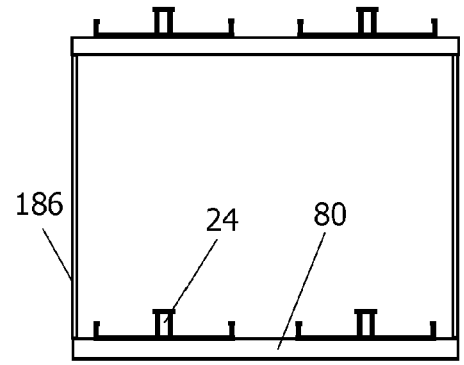
FIG. 9 shows an arrangement of 4 tracks.
Figure 10:
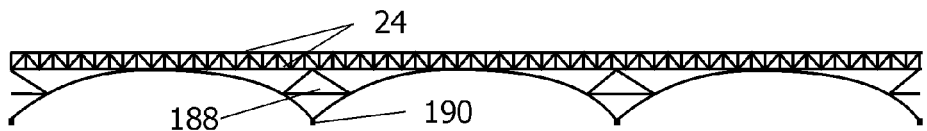
FIG. 10 shows an overhead construction of the autoway with 4 tracks.

FIG. 9 shows a 4-lane construction of autoway for a major traffic route. A second level is constructed on the first level with open frame supporting structures 186. Due to the small size of autocars, the four-lane construction occupies less space than one standard lane on the highway or space of one track on the railway. It will be shown that its capacity for moving people is equivalent to four 6-lane highways. This structure can be built either underground or overhead at the median line of existing highway. FIG. 10 shows a side view of an overhead construction of a 4-lane autoway. Open frame structure 188 is built on small foundations 190 to support the tracks 24 of autoway. The lightweight structure offers more opportunities for aesthetic considerations. It is also less susceptible to wind, rain, snow, and earthquake. As many components can be pre-manufactured, a significant shorter construction period and a lower construction cost are possible as compared with other road construction.

The control system of autoway is divided into three levels: central control system 30, wayside control-point control system 28, and vehicle control system 42. The central control system is responsible for functions related to the whole autoway system, such as vehicle registration, user registration, and traffic control. At any moment, the central control system knows the locations of all parked vehicles, the destinations of all moving vehicles, and the approximate locations of all moving vehicles within a known track segment. The central control system also knows the working conditions of all the tracks, stations, stops, and parking facilities. With the knowledge of the locations of parked vehicles, the central control system can dispatch a vehicle to the location on demand. With the destination information, the central control system can arrange dynamic coupling of vehicles. Preferably, a map of the autoway is displayed on the monitor of the computer of the central control system with all the vehicles simulated on the map. Various traffic statistics are also displayed. Manual intervention can be implemented when necessary. In practice, a series of computers are used for reliability and scalability. In case of failure of a computer, a backup computer will automatically take over. More computers can be added in response to an increase in the traffic volume. In a sense, the traffic control is similar to data flow on the internet and some computer network techniques can be borrowed for the control of vehicles on autoway.

The central control system plans the traffic flow of each vehicle on a segment basis before a control point. The traffic flow instruction includes the direction and the speed profile for the next segment. A control point is like the traffic light on the street. Control points are set up before diverging, merging, stops and stations, with enough distance for emergency braking. The control points divide the autoway track network into segments. The exact location of a vehicle is only known to the central control system at a control point when the wayside control system detects the identity of a moving vehicle. At this point, the wayside control system operates the switch for the desired direction, and the vehicle is informed of the location of the control point and then follows the speed profile. The location information is displayed to the user for psychological reasons just as the floor number is normally shown on an elevator. The central control system can use the speed profile to calculate the approximate location of the vehicle for planning purpose. Delegating the implementation of traffic flow to the wayside control system and the vehicle control system is cost-effective in comparison with the high guideway cost of the fixed block system and the demanding communication requirements of the moving block system used in conventional railways. In the fixed block scheme, the guideway is divided into segments called blocks and apparatus is provided in each block to detect the presence of a vehicle. The minimum separation between vehicles is at least one block. When a short headway is desired, the infrastructure cost becomes excessive. In the moving block scheme, each vehicle transmits its location to the central control system and receives instructions from the central control system on a periodic basis. The headway is related to the communication rate. When a short headway is desired, the communication load becomes excessive. The control method in the present invention is feasible due to the collision avoidance system of the vehicle and the ability of the autocar to stop in a short distance like an automobile.

The wayside control system 28 is a computer system related to the operations of stations and stops, diverging, and merging. The central control system informs the wayside control system before each control point the sequence of arriving vehicles, directions of travel, and the status of entraining. The wayside control system then implements the direction control by turning the proper switch position. The issue of merging involves two control points, and the wayside control systems are connected and their actions are set to be exclusive, that is, only one is open for traffic at a time.

The vehicle control system 42 is a computer system related to the operations at the vehicle level, such as access control, speed, braking, coupling and decoupling procedures, and collision avoidance. Before each control point, a speed profile is provided to the vehicle control system from the central control system. The speed profile is designed for the specific segment of the track. It consists of a series of speed and distance instructions. For example, an autocar from a turnout side at a merging point may get a speed profile: 50 km/hr to 30 km/hr in a distance of 20 m, 30 km/hr for a distance of 30 m (the turning part), 30 km/hr to 100 km/hr in a distance of 35 m (the additional rubber tire will be activated by the vehicle control system for the necessary acceleration), and 100 km/hr for 500 m. In this case, the autocar is assumed to take care of the transition of speed by a predetermined procedure, but maintain the end results of time and distance. Other forms of speed profiles may also be used. Since the speed meter and distance meter of the vehicle are used, small errors may occur but the errors are eliminated at each control point. The actual physical implementation of the speed control can use currently available technologies for automobiles and trains. As the cost of the vehicle control system scales up with the capacity, the system can be also economically viable for a relatively low traffic density.

The central control system assumes that the wayside control system and the vehicle control system perform the functions as instructed. Eventually some errors will happen. There are redundancies to reduce the effect of malfunctions in devices. At each level, procedures are established to catch potential errors and correct the errors if possible, and then the errors are reported to the central control system. A warning will be issued to the central control system if an error cannot be fixed and potentially dangerous. The central control system will respond immediately to any warning messages. The central control system will use the error messages to make maintenance and improve operation procedures. At the vehicle level, the distance sensor device will be used to avoid collision. Besides, the error reports can be used for improvements in new versions of the control software.

Although autoway is offered as a solution to urban traffic congestion and air pollution, it can also be very useful in other places. For example, autoway can be used on a company campus, a university campus, and a military base, for internal transportation. In a national park, autoway can provide a high volume of traffic with minimum impacts on the environment due to its small size and easy of construction. The autoway can also provide some preliminary access control to certain parts of the track network. In rural areas with many rivers or mountain areas with a difficult terrain, it may be costly to build a highway but an autoway can be built at a low cost. The autonomous nature of the autoway and the open frame structure of an overhead construction make the autoway more reliable in bad conditions such as fog, rain, wind, snow, flood, and falling rocks. The communication network of the autoway can also provide rural and mountain areas with access to broadband communication and help social and economical developments in these areas.

As for light cargo transportation, autoway can be an ideal delivery system in connection with electronic commerce for small items with dispersed destinations. A sender can set the destination and the receiver for the autocar, and the receiver can be notified in advance the time of arrival, and then the designated receiver can open the autocar with his access device. It can be set up to transport goods between factories, users, warehouses, and stores with specifically designated stations and the delivery can be performed at light traffic periods.

Autoway provides a mode of surface transportation for both private and public transportation with convenience and comfort. As a form of public transportation, autoway retains all the features of the concept of personal rapid transit. As a form of private transportation, autocar is safer, more comfortable, and more affordable than automobile. A person sitting comfortably in an autocar can make phone calls, play DVD video, read a newspaper, or browse the internet, at his own privacy. Since autocar goes directly to the destinations without any stops and transfers, considerable time will be saved for commuters. A tourist no longer needs to worry about driving directions or transfers at stations. As a public transportation, it is available 24 hours a day and 7 days a week and offers the convenience, comfort and privacy of a personal transportation system. Driving an autocar is as easy as using an elevator. The only thing a passenger needs to know is his destination. This offers the advantages of personal transportation to many people such as school children and senior citizens who cannot use an automobile on their own.

Figure 11:
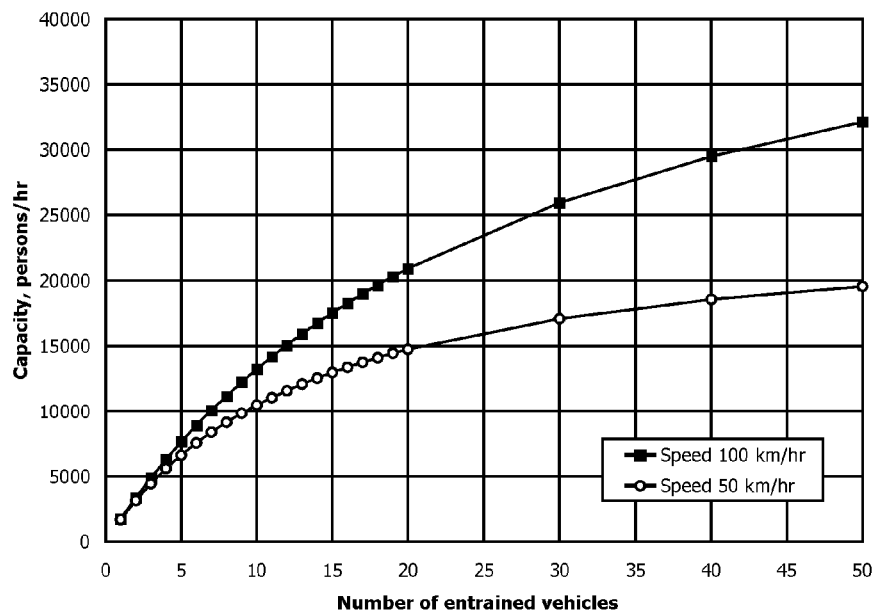
FIG. 11 illustrates the relationship between the capacity and the number of entrained vehicles in a single lane.

Table 1 lists the operational capacities of existing urban transportation systems and autoway. A conservative headway of 2 seconds is used for both automobile and autocar. It should be noted that all the capacities can be increased significantly at the expense of comfort and safety. For example, the average occupancy of automobile is 1.1 and a capacity of 2200 vehicles/hr is possible at a shorter headway. If a car can always operate at full occupancy of 4 people, the capacity will be quadrupled. The capacity of bus and subway can be easily doubled during rush hours with half of the passengers standing. The headways of bus and subway can be technically much shorter but are mainly limited by the feeding mechanisms for stations. The capacity values of Table 1 are typical numbers in some medium-density metropolitan areas in the United States at comparable safety and comfort. As shown in FIG. 11, the capacity of autoway increases with the number of entrained vehicles. The minimum capacity of an autoway lane is equivalent to a highway lane when there is no entraining. Although most people drive alone on highway, a significant number of automobiles actually share the same direction at least for some segments of the trip. Dynamic coupling on autoway is like virtual car-pool. If the traffic condition in an area is known, the capacity of autoway can be better estimated by computer simulation. A simple estimation is given by analysis of the capacity of subway. The line capacity of 7,812 persons per hour is equivalent to 2.17 persons per second. It takes only 3.6 seconds to have 8 people to share the same direction. Therefore, the choice of 8 cars per train seems to be reasonable. When the subway capacity is doubled during rush hours, the capacity of autoway can also be doubled. In a sense, autoway has certain elasticity in capacity to accommodate an increase in the traffic flow. Roughly speaking, one lane of autoway is equivalent to one subway line or one 6-lane highway. Since four lanes of autoway can be accommodated in the space of one highway lane, a 4-lane autoway may have a capacity of four subway lines or four 6-lane highways.

| Vehicle type | Capacity (persons/hr) | Ratio | Remark |
|---|---|---|---|
| Automobile | 1,673 | 1 | Single occupant, headway = 2 s, car length = 4.2 m. |
| Bus | 798 | 0.5 | 40 occupants, headway = 180 s, bus length = 12 m. |
| Automobile + Bus | 2,442 | 1.5 | Same conditions as above. |
| Subway | 7,812 | 4.7 | 5-car train, 400 occupants, headway = 180 s, car length = 24 m. |
| Autocar (1 lane) | 11,180 | 6.7 | 8-car train, 8 occupants, 1 lane, headway = 2 s, car length = 2 m. |
| Autocar (4 lanes) | 44,270 | 26.7 | 8-car train, 8 occupants, 4 lanes, headway = 2 s, car length = 2 m. |

The cost of construction, operation and maintenance of autoway will be significantly less than existing guideway systems. The autocar will cost much less than an average automobile. The small size of autocar results in light guideway structures. Construction of the guideway is mostly an efficient assembly process since the guideway can be pre-manufactured in a factory, for example, as welded structures. The autoway stops and stations are simple and small. Stops and stations can normally be constructed to connect to the basement, ground floor, or other floor of an existing building. This both adds convenience to the users, and saves the costs of adding additional elevators. The three-level control system reduces the cost of automation. In addition, computers and communication devices are reliable and widely available at low cost nowadays. Snow removal of the guideway can be accomplished automatically by a specially designed snow-removing vehicle. Since error reporting procedure s are used in the control systems, maintenance can be easily performed by replacing faulty modules. Only a small number of staff are needed to operate and maintain the software and hardware of the autoway system. Therefore, the advantages of personal transportation can be provided at a competitive cost.

The fuel efficiency of autocar will be significantly higher than automobile. The weight of an autocar will be less than 25% of the weight of an average automobile. The front area of an autocar is about 50% of an automobile. The low drag of steel rail will offer an energy saving of about 25%. The high efficiency of the electric motor and electricity generation will offer an energy saving of about 50%. It is estimated the fuel consumption of the autocar is about 5% of an average automobile. If we assume the gas mileage of an average automobile is 10 km/liter (25 mile/gallon), the autocar can achieve a gas mileage of about 200 km/liter (500 mile/gallon). There may be some departure from the estimate, but the improvement in fuel efficiency is significant. For freight transportation, the design of the passenger vehicle sets the limits for the weight and dimensions of the freight vehicles. For certain freights, the container and vehicle weight can be significantly reduced to further improve fuel efficiency.

The high fuel efficiency of autocar will significantly reduce air pollution in urban areas. In rural areas, autoway can reduce the environment problem of soil erosion related to highway construction, and the overhead construction of autoway reduces interference with wild life. The noise level of autocar will be very low due to the light weight and the relatively low speed of the vehicle, and the high precision and maintenance of the track network. The light guideway will also provide opportunities for aesthetic structures.

Autoway will be a safe and reliable transportation mode. Since 90% of accidents on highway are caused by human errors, autoway essentially eliminates this accident source. Redundancy and error-checking in the system will make system-related accidents rare. For example, vehicle identifications can be obtained from both the bar code and the smart card. Both wired and wireless inter-vehicle communications are provided. The network structure of communication and track will ensure proper operations even if some segments have failed. Procedures for collision avoidance are implemented at all the three levels of control systems. Other safety issues such as theft, robbery, and contagious diseases, are also significantly reduced. Autoway is also less susceptible to wind, rain, snow, fog, and earthquake. The central control system can be linked to an earthquake warning system, and emergency procedures can be initiated during an earthquake.

Other embodiments of the invention will be apparent to those skilled in the art from a consideration of this specification or practice of the invention disclosed herein. For example, the length of autocar can be increased to have more than one seat in places with a higher average occupancy. Special vehicles can be designed for people with disabilities. A hook can be provided to pull the autocar for steep grades. Noise barriers can be set up near the sources of noises. Weight sensors can be installed at stations and stops or on the track to avoid overloading. Surface modification of the wheels and rails can be performed for better performance. Other coupling devices can be used. For the central rail, the horizontal surface can be physically in several sections but functionally as one similar to some monorail designs, and the vertical surface can be in the form of a bar or tubing. Other existing methods for centering the vehicle and providing additional driving and braking ability can also be adapted for the system. At seaside, the tracks can be made of polymer-based composite materials instead of steel to avoid corrosion. Data encryption and verification can be used for communication security. It is intended that the specification and examples shall be interpreted as illustrative and not in a limiting sense, with the true scope and spirit of the invention being indicated by the following claims.

What is claimed is:

1. A transportation system for moving passengers and freight, comprising:
   a track network, said track comprising a pair of side rails and a central rail;
   a plurality of vehicles, each said vehicle having a body with a width for one passenger seat, a plurality of wheels engaged on said side rails for supporting the vehicle, a plurality of guiding wheels engaged on said central rail for centering the vehicle on the track, an identification means for providing vehicle identification information, a distance sensor for measuring distance and speed of an object in front of the vehicle, a wireless communication means, driving and braking means, and a vehicle control system connected with said distance sensor and said driving and braking means for controlling the driving and braking of the vehicle;
   a plurality of stops and stations on the side tracks off the main lines of said track network for loading and unloading, each stop and each station having an access notification device;
   a plurality of wayside control systems, each having a computer system, a means for detecting said vehicle identification information of said identification means of the vehicle, and a means for controlling switches on said track network;
   a central control system having a computer system for user registration, vehicle registration, and controlling the traffic flow;
   a communication network connecting said central control system, said wayside control system, said vehicle control system, and said access notification system;
   whereby a passenger can enter said vehicle at a station or stop and move directly from origin to destination.

2. The transportation system of claim 1, wherein said central rail has a substantially horizontal surface of high traction and substantially vertical surfaces symmetric with the central vertical plane of said track, and further comprising an additional driving and braking means, an actuating mechanism being adapted for movement of said additional driving and braking means between an unengaged position and an engaged position on said horizontal surface of said central rail for extra acceleration and braking capability in response to a signal from said vehicle control system.

3. The transportation system according to claim 1, wherein said vehicle further comprises a coupling means for mechanically and electrically coupling the vehicles to form a train, said coupling means being adapted for movement between a coupled position and an uncoupled position in response to a signal from said vehicle control system;
   whereby said central control system gives instruction to said vehicle control system for performing static and dynamic coupling of the vehicles;
   whereby the capacity of said transportation system is increased by entraining.

4. The transportation system according to claim 3, wherein said coupling means further comprises a sensor means for measuring the force between said coupled vehicles and sending said force information to said vehicle control system to adjust the driving means.

5. The transportation system of claim 1, wherein said vehicle further comprises an input panel for inputting destination information;
   whereby said passenger can change his destination during a trip.

6. The transportation system of claim 1, further comprising a plurality of automatic parking facilities, each having a plurality of carriers for moving said vehicles to a parking position, and retracting said vehicles from a parking position.

7. The transportation system of claim 1, further comprising a plurality of access devices, each access device having a memory for the user account information, a LCD display for said vehicle identification number, an open button, an close button, and a wireless communication means for communicating with the vehicle control system and the access notification device;
   whereby a said user can use said access device to communicate with said access notification device and operate said vehicle.

8. A transportation system for moving passengers and freight, comprising:
   a track network, said track comprising a pair of side rails and a central rail, said central rail comprising a plurality of movable sections for switching the direction of vehicles on said track network;

a plurality of vehicles, each said vehicle having a body, a plurality of wheels engaged on said side rails for supporting the vehicle, a plurality of guiding wheels engaged on said central rail for centering the vehicle on the track;

a plurality of wayside control systems, each having a means for controlling switches on said track network;

a central control system having a computer system for controlling the traffic flow.

9. A method of controlling movement of a vehicle through a track network having a plurality of merging points, diverging points, stations and stops, from an origin to a destination, comprising assigning a vehicle identification number to said vehicle;

providing means for storing said vehicle identification number in said vehicle;

providing a distance sensor means to said vehicle for avoiding collisions;

setting up a plurality of control points, each before said merging point, diverging point, station and stop;

dividing said track network into a plurality of segments between said control points;

providing a wayside control system at each said control point, each said wayside control system has a means for detecting said vehicle identification number and a means for switch operation;

providing a vehicle control system to said vehicle for controlling the operation of said vehicle, said vehicle control system operatively connected to said distance sensor means;

providing a communication network for connecting said central control system with a plurality of said wayside control system and said vehicle control system;

planning the direction and speed profile of said vehicles before said control points by said central control system;

informing the direction of said vehicle to said wayside control system and informing the speed profile information to said vehicle control system through said communication network;

detecting said vehicle identification number of said vehicle by said wayside control system;

implementing said direction of said vehicle by said wayside control system;

implementing said speed profile for said segment of said track network and avoiding collision according to information from said distance sensor means by said vehicle control system;

whereby the infrastructure cost of said track network and the communication demand in said communication network are reduced.

* * * * *